(12) United States Patent
Müller et al.

(10) Patent No.: US 8,600,307 B2
(45) Date of Patent: Dec. 3, 2013

(54) CONTROL DEVICE OR HYBRID DEVICE

(75) Inventors: Gerald Müller, Pohlheim (DE);
Andreas Peiker, Friedrichsdorf (DE);
Lutz P. Richter, Mixdorf (DE);
Christoph Schillo, Friedrichsdorf (DE);
Marcus Schulze, Gießen (DE)

(73) Assignee: Peiker Acustic GmbH & Co. KG, Friedrichsdorf (DE)

( * ) Notice: Subject to any disclaimer, the term of this patent is extended or adjusted under 35 U.S.C. 154(b) by 126 days.

(21) Appl. No.: 13/364,816

(22) Filed: Feb. 2, 2012

(65) Prior Publication Data

US 2012/0202566 A1    Aug. 9, 2012

Related U.S. Application Data

(60) Provisional application No. 61/553,470, filed on Oct. 31, 2011.

(30) Foreign Application Priority Data

Feb. 4, 2011  (DE) .................. 10 2011 010 400

(51) Int. Cl.
*H04B 7/00*     (2006.01)
*H04K 3/00*     (2006.01)

(52) U.S. Cl.
USPC ...................... 455/66.1; 455/345; 710/100

(58) Field of Classification Search
USPC ............... 455/41.2, 41.3, 66.1, 345; 710/100
See application file for complete search history.

(56) References Cited

U.S. PATENT DOCUMENTS

| 7,406,340 B2 | 7/2008 | Juengling et al. |
| 8,417,860 B2 * | 4/2013 | Choi ........................... 710/100 |
| 2007/0156311 A1 | 7/2007 | Elcock et al. |

FOREIGN PATENT DOCUMENTS

| DE | 103 10 115 A1 | 9/2004 |
| WO | 2010/000262 A1 | 1/2010 |

OTHER PUBLICATIONS

Wilfred A. Melendez et al., "*The Upper Layers of the ISO/OSi Reference Model (Part II)*," Computer Standards and Interfaces, vol. 5, No. 2, Jan. 1, 1986, pp. 65-77.
International Search Report and Written Opinion dated Jun. 27, 2012.

* cited by examiner

*Primary Examiner* — Lee Nguyen
(74) *Attorney, Agent, or Firm* — Burr & Brown

(57) ABSTRACT

The invention relates to a control device, a hybrid device, a method for operating an arrangement (A) for processing data packets, an arrangement (A) for processing data packets and to an electronic device.

19 Claims, 2 Drawing Sheets

CONTROL DEVICE OR HYBRID DEVICE

CROSS REFERENCE TO RELATED APPLICATION

This application is an application claiming the benefit under 35 USC §119(e) of U.S. Provisional Application 61/553,470 having a filing date of Oct. 31, 2011 and claims the benefit under 35, USC §119(a)-(d) of German Application No. 10 2011 010 400.3 filed Feb. 4, 2011, the entireties of which are incorporated herein by reference.

FIELD OF THE INVENTION

The invention relates to a control device, to a hybrid device, to a method for operating an arrangement for processing data packets, to an arrangement for processing data packets and to an electronic device.

BACKGROUND OF THE INVENTION

DE 103 10 115 A1 discloses an arrangement for remotely controlling a mobile radio telephone in a motor vehicle. This arrangement comprises an independent interface module which, as an output unit, also establishes a standardized interface to a CAN bus, the interface module also comprising a communication management unit in which the data formats are converted between the radio telephone and the output unit. The disadvantage of this arrangement is that the communication management unit must have the device-specific instruction sets for data transmission, so that the unit can convert the data formats between the radio telephone and the input and output units. In this arrangement according to the prior art, the interface module is used to translate between the language of the vehicle bus and the language of the mobile radio telephone using computation power.

Nowadays, a control device which is permanently installed in a vehicle and is designed as a gateway unit or an interface unit must support vehicle-related applications on an electronic device, in particular a mobile telephone, over the entire service life of the vehicle, in which case it must be taken into account that new and more complex applications may thoroughly overtax the computation power and hardware configuration of the control device permanently installed in the vehicle.

SUMMARY OF THE INVENTION

The object of the invention is to propose a control device for a vehicle bus, a hybrid device, a method for operating an arrangement for processing data packets, an arrangement for processing data packets and an electronic device which simplify integration or connection of the electronic device into or to a vehicle bus and increase the performance thereof.

The object of the invention is, in particular, to propose a control device for a vehicle bus, which device forms a gateway for a vehicle-related application running on an electronic device, in particular a mobile electronic device such as, in particular, a mobile telephone. In this case, the intention is to avoid restriction or limitation of such an application, which would result from excessively low computation power or insufficient hardware integration of the control device operating as a gateway.

Furthermore, the object of the invention is, in particular, to propose a hybrid device, a method for operating an arrangement for processing data packets and an arrangement for processing data packets which are upward-compatible without the need to update a control device installed in the vehicle when the electronic device is changed. Furthermore, the object of the invention is to minimize the computational complexity, which is required when operating an electronic device on a vehicle bus, in a control device.

Finally, the object of the invention is, in particular, to propose an electronic device which is designed, in particular, as a mobile electronic device and, in particular, as a mobile telephone, which can be connected to a vehicle bus using the control device according to the invention.

The essence of the invention is the practice of moving part of the functionality of a control device to another electronic device which has the application. The essence of the invention is thus the practice of moving some of the functions or layers of the control device to the electronic device which is designed, in particular, as a mobile telephone, some of the original control device functions being implemented using software within the framework of an application which can be installed on hardware of the electronic device. In other words, the load on the control device, as an interface between an application on the electronic device and the vehicle bus, is relieved by reducing the tasks of the interface to a pure switching and transport function. For this purpose, essential functional components or the application-related layers of a bus implementation, for example a CAN bus implementation, are not implemented in the control device but rather are moved to the application in the electronic device. As a result, some of the computation power produced per se in the control device is moved to the electronic device. This is particularly advantageous because a more modern electronic device which replaces an older electronic device is generally more powerful and is thus able to compensate for the possibly higher demands imposed on the computation power, and the control device can thus continue to be used without disadvantages despite the higher demand. The data link layer is divided between the control device and the electronic device and forms the basis of the link between the two implementations. In this case, it is particularly advantageous that the hardware of a control device installed in the vehicle does not need to be updated when using different, possibly modernized electronic devices. Rather, the installation of a suitable application on the hardware of the electronic device is sufficient. This ensures full upward compatibility with regard to the electronic device used.

Furthermore, the essence of the invention is to establish direct communication between the electronic device and the control device, which communication takes place in a language of the connected vehicle bus or in a protocol defined for the data link layer, with the result that no translation or only minor translation of the received and transmitted data packets is required in the devices involved. The data packets are thus interchanged between the two devices without complicated protocol conversion. This saves computation power which would otherwise have to be provided by the control device.

In the sense of the invention, a control device is understood as meaning a gateway unit or interface unit, a gateway unit in the sense of the invention being an electronic device which makes it possible to connect an electronic device to a vehicle bus, and an interface unit in the sense of the invention being an electronic device which, as an interface, enables communication between the vehicle bus and the electronic device, the electronic device being designed, in particular, as a mobile electronic device and, in particular, as a mobile telephone.

In the sense of the invention, the layers of a layer model, which has seven layers for example, are denoted using the technical terms mentioned below.

The seventh layer is referred to as the application layer. The seventh or uppermost layer is defined by the application itself and comprises the actual application software.

The sixth layer is referred to as the presentation layer. The presentation layer is responsible for data conversion and for encrypting the data.

The fifth layer is referred to as the session layer. The session layer is responsible for controlling data flow and for dialog control.

The fourth layer is referred to as the transport layer. The transport layer is responsible for transmitting the data packets.

The third layer is referred to as the network layer. The network layer is responsible for setting up connections. This also includes routing and the stipulation of the data path.

The second layer is referred to as the data link layer. This level controls access to the physical level.

The first layer is referred to as the physical layer. The physical level describes the physical, hardware level of the control device.

BRIEF DESCRIPTION OF THE DRAWINGS

Further details of the invention are described using schematically illustrated exemplary embodiments in the drawings.

DETAILED DESCRIPTION OF THE INVENTION

Figure 1:
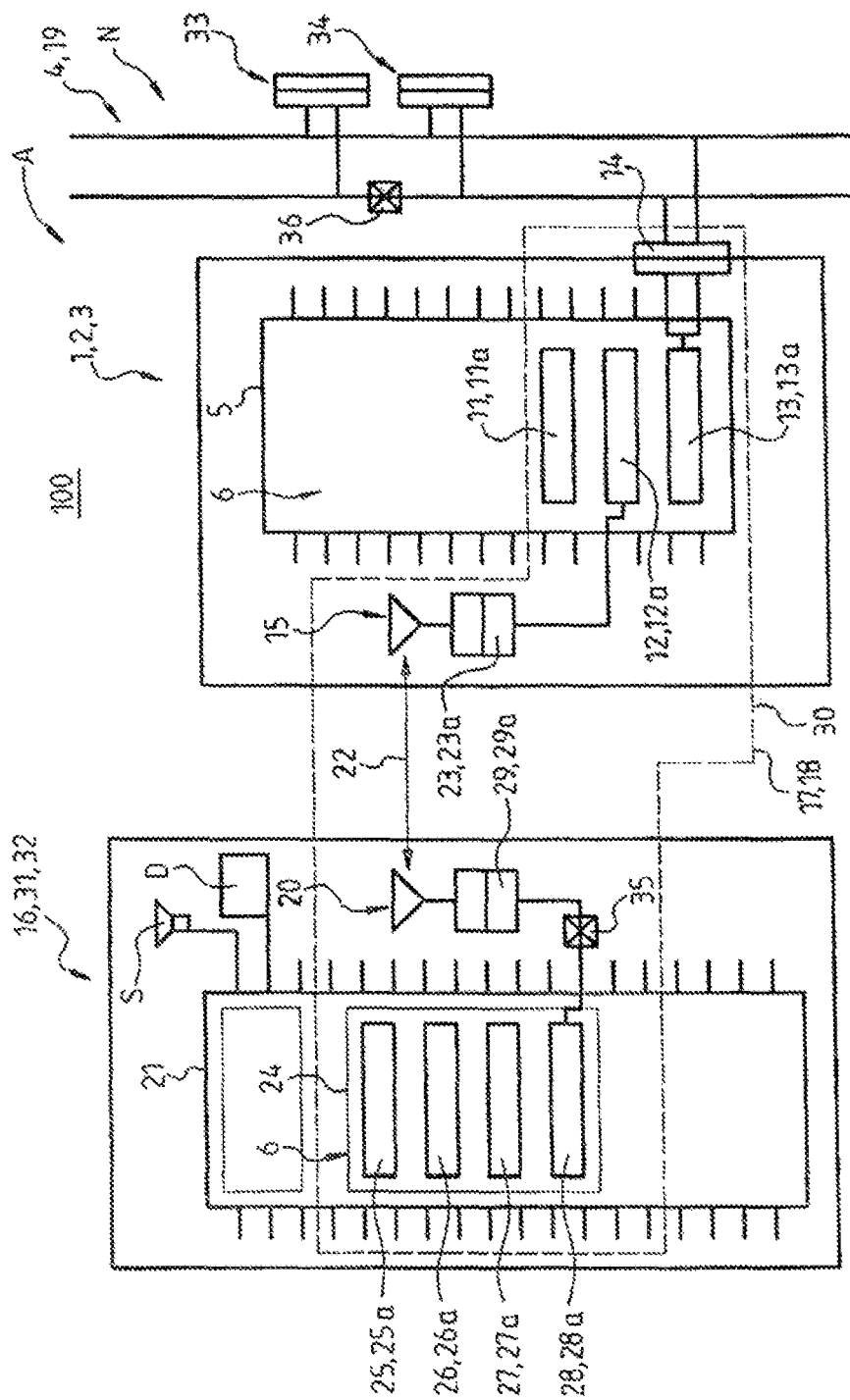
FIG. 1 shows a schematic view of an arrangement according to the invention with a control device and an electronic device.

FIG. 1 shows an arrangement A which is arranged in a vehicle 100 and comprises a control device 1, an electronic device 16, a vehicle bus 4 and further bus subscribers 33 and 34. FIG. 1 also shows a hybrid device 17 which comprises the control device 1 connected to the vehicle bus 4 and the electronic device 16, the electronic device 16 being designed as a mobile electronic device 31 and, in particular, as a mobile electronic communication device 32, for example a mobile telephone. If the two devices 1 and 16 are connected via a bidirectional communication link 22, they form a two-part control device 30 which physically consists of two devices and is also referred to as a two-part ad-hoc control device since two terminals wirelessly cooperate here if necessary. In this case, the same control device 1, which is designed as a vehicle control device 2 and, in particular, as a CAN bus control device 3, cooperates with the electronic device 16 illustrated or with another electronic device (not illustrated) and respectively forms, with the respective electronic device, a hybrid vehicle control device 18 which is designed as a hybrid ad-hoc control device. In this case, an application 24 is installed on each of the electronic devices suitable for cooperation, which application implements the upper layers 25, 26, 27, 28 of a layer model 6 used, the layers being needed to complete the physically present control device 1. The upper layers 24-28 are the application layer 25a, the presentation layer 26a, the session layer 27a and the transport layer 28a. The application 24 is respectively adapted, in particular, to the vehicle 100 and/or, in particular, to the control device 1 and/or, in particular, to the electronic device 16. The application 24 is provided, as a software program or a so-called app, at least for a particular arrangement comprising a particular electronic device, a particular control device and a particular vehicle. The arrangement according to the invention thus makes it possible, by selecting the appropriate application, to use the vehicle bus for bidirectional communication with other bus subscribers, via the control device arranged in the vehicle, using each application-enabled electronic device without having to make any changes in the vehicle or updates to the control device 1. Installing the application 24 on freely programmable hardware 21 of the electronic device 16 implements the upper layers 25-28 of the layer model 6 used there. As a result, the essential computational complexity for creating data packets 35 which are addressed to the vehicle bus 4 resides with the electronic device 16. The data packets 35 produced in the electronic device 16 are transmitted from the application 24 and, in particular, from the transport layer 28a to the control device 1 via the bidirectional communication link 22. Transmission is effected wirelessly, via an interface 20 of the electronic device 16, to an interface 15 of the control device 1. The interfaces 20 and 15 are each designed as Bluetooth transceivers and each have a data link layer 29a and 23a as the layer 29 and 23. An embodiment variant (not illustrated) also provides for the data packets 35 to be transmitted without using a special Bluetooth protocol. The control device 1 comprises hardware 5 on which three layers 11, 12 and 13 of the layer model 6 used are implemented. The layers 11-13 are a network layer 11a, a data link layer 12a and a physical layer 13a. Therefore, the electronic device 16 and the control device 1 together have all seven layers of the layer model 6 used. The interface 15 which receives the data packets 35 transmitted by the electronic device 16 is connected to the data link layer 12a of the control device 1. The incoming data packets 35 are addressed to bus subscribers 33, 34 with the aid of the network layer 11a and are placed onto the vehicle bus 4, which is designed as a CAN bus 19, by the physical layer 13a. The vehicle bus 4 or the CAN bus 19 forms a network N via which the bus subscribers 33, 34 and the control device 1, which can likewise be understood as meaning a bus subscriber, are connected. For this purpose, the physical layer 13a is connected to a further interface 14 via which the control device 1 is connected to the vehicle bus 4. Conversely, data packets 36 which are addressed to the control device 1 by one of the bus subscribers 33, 34 are passed to the physical layer 13a via the interface 14 of the control device 1 and are then passed from the control device 1 to the interface 15 of the control device 1 via the data link layer 12a without passing through all of the layers of the layer model 6 used in the control device 1. The data packets 36 are then wirelessly transmitted from this Bluetooth interface 15 to the Bluetooth interface 20 of the electronic device 16. The interface then passes the data packets 36 to the upper layers 25-28 of the layer model 6 used which are implemented in the hardware 21 of the electronic device 16. Here, the data packets 36 are then unpacked and are optically and/or acoustically output to a display D and/or a loudspeaker S, for example. The layers 25-28 implemented in the electronic device 16 and the layers 11-13 implemented in the rudimentary control device 1 together form all of the layers of the layer model 6 used and thus form the core of the hybrid vehicle control device 18 formed from two physically separate or separable and independently operating devices 1, 16.

Figure 2:
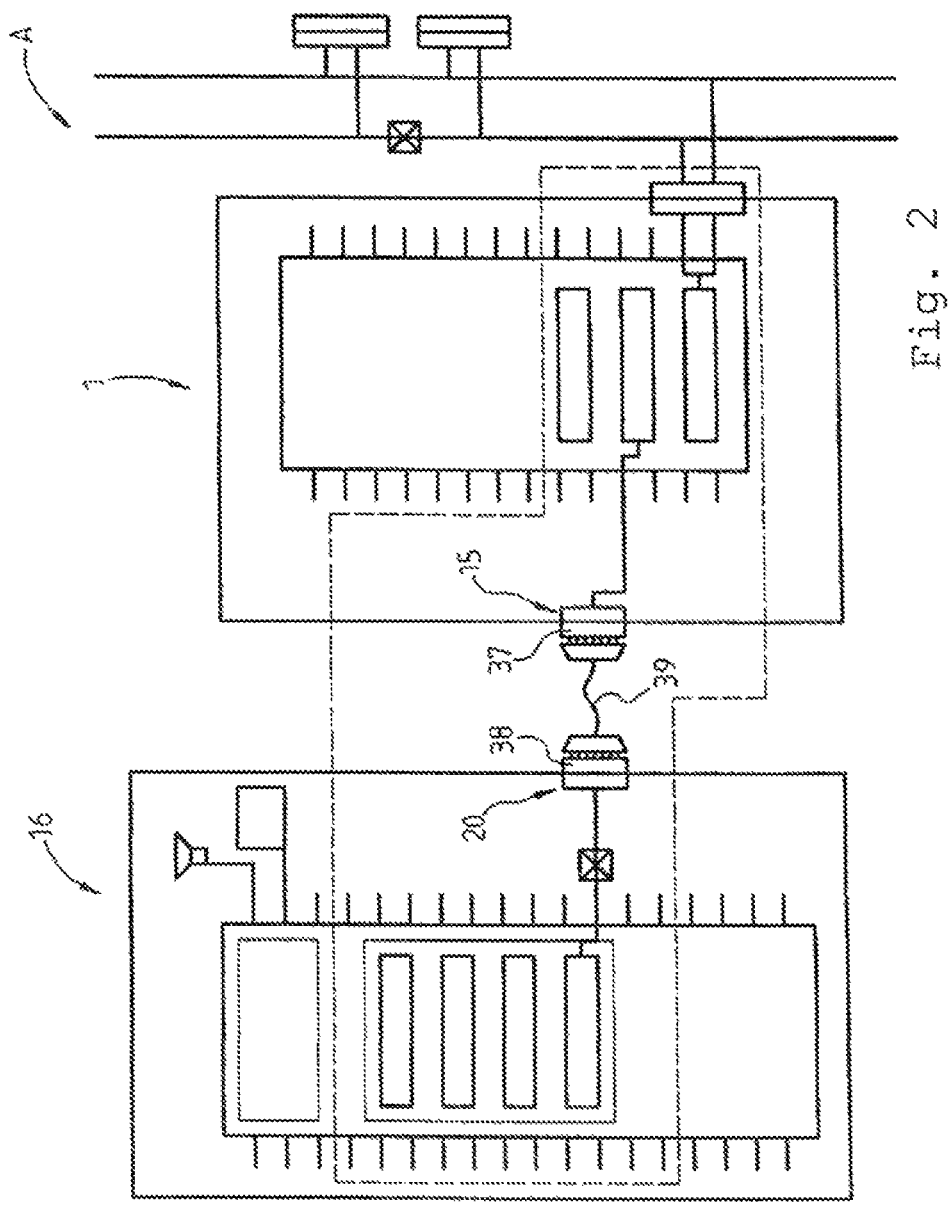
FIG. 2 shows an embodiment variant to the arrangement shown in FIG. 1.

FIG. 2 again illustrates the arrangement A shown in FIG. 1. In this respect, reference is made to the description with respect to FIG. 1. In contrast to FIG. 1, the interface 15 of the control device 1 and the interface 20 of the electronic device 16 are not designed as Bluetooth transceivers but rather are each implemented by means of a mechanical connector 37 and 38. The invention provides for the two devices 1, 16 to be connected to a data cable 39 and thus for bidirectional communication to be established between the two devices. The invention provides, in particular, for the connectors 37, 38 to be designed as USB connectors and for the data cable 39 to be designed as a USB data cable. According to an embodiment variant (not illustrated), provision is also made for the two devices to be directly connected to one another via the two connectors, avoiding the use of a data cable.

The invention is not restricted to illustrated or described exemplary embodiments. Rather, it comprises developments of the invention within the scope of the claims.

LIST OF REFERENCE SYMBOLS

1 Control device
2 Vehicle control device
3 CAN bus control device
4 Vehicle bus
5 Hardware of 1
6 Layer model
7-10 Not assigned
11-13 Layers of 6 in 1
11a Network layer
12a Data link layer
13 Lowermost layer of 6
13a Physical layer
14 First interface of 1
15 Second interface of 1
16 Electronic device
17 Hybrid device
18 Hybrid vehicle control device
19 CAN bus
20 Third interface of 16
21 Freely programmable second hardware of 16
22 Bidirectional communication link between 1 and 16
23 Layer of 15 in 16
23a Data link layer
24 First application for 21
25-28 Upper layers of 6
25a Application layer
26a Presentation layer
27a Session layer
28a Transport layer
29 Layer of 20
29a Data link layer
30 Two-part control device
31 Mobile electronic device
32 Mobile electronic communication device
33, 34 Bus subscribers
35 Data packet from 16 for 4,
26 Data packet from 33 or 34 for 1
37 Connector at 1
38 Connector at 16
39 Data cable
100 Vehicle
A Arrangement
D Display of 16
N Network
S Loudspeaker.

We claim:

1. A control device, for connection to a vehicle bus comprising:
   a layer model having a plurality of layers implemented in hardware of the control device,
   a first interface via which the control device is connected to the vehicle bus, and
   a second interface which is used to communicate with an electronic device,
   wherein the second interface communicates directly with a data link layer of the layer model.

2. The control device according to claim 1, wherein the layer model consists of three layers, a physical layer, the data link layer and a network layer, and the second interface of the control device is a serial interface for serial communication.

3. The control device according to claim 2, wherein the serial interface is a radio serial communications interface.

4. The control device according to claim 3, wherein the radio serial communications interface is a Bluetooth standard serial communication interface.

5. The control device according to claim 1, wherein the electronic device communicating with the control device comprises a serial interface for serial communication, and the electronic device is a mobile electronic device.

6. The control device according to claim 5, wherein the electronic device is a mobile electronic communication device.

7. The control device according to claim 1, wherein the control device is one of a CAN bus control device, a FlexRay control device, and a byteflight control device.

8. A hybrid device, for connection to a vehicle bus comprising:
   a control device and an electronic device, wherein
   the control device and the electronic device have a bidirectional communication link,
   the control device is connected to the vehicle bus,
   lower layers of a layer model are implemented on first hardware of the control device said layers include a physical layer, a data link layer and a network layer,
   the electronic device comprises second hardware,
   a first application, which is matched to the electronic device and to the control device, is installed on freely programmable hardware of the electronic device, and implements upper layers of the layer model on the freely programmable hardware of the electronic device, and
   a two-part control device is formed in the hybrid device as a result of the upper layers of the electronic device being connected to the lower layers of the control device using the communication link.

9. The hybrid device according to claim 8, wherein the electronic device is a mobile electronic device.

10. The hybrid device according to claim 8, wherein
    the control device further comprises a first interface and a second interface,
    the control device is connected to the vehicle bus via the first interface,
    the electronic device comprises a third interface,
    the bidirectional communication link exists between the control device and the electronic device as a result of the use of the second and third interfaces,
    the second interface of the control device, is a data link layer having a direct bidirectional communication link to the data link layer on the first hardware of the control device,
    an application layer, a presentation layer, a session layer and a transport layer are implemented by the first application on the hardware of the electronic device, and
    the third interface of the electronic device is a data link layer having a direct bidirectional communication link to one of the layers implemented on the second hardware of the electronic device.

11. The hybrid device according to claim 10, wherein the second interface and the third interface are radio interfaces.

12. The control device according to claim 11, wherein the radio interfaces are Bluetooth radio interfaces.

13. The control device according to claim 8, wherein the control device is one of a CAN bus control device, a Flex Ray control device, and a byteflight control device.

14. A method for operating an arrangement for processing data packets, the arrangement comprising an electronic device, a control device, and a network formed by a vehicle bus and bus subscribers, wherein
- a first data packet, which is addressed to the electronic device by one of the bus subscribers, is received by the control device, passing through a physical layer and a data link layer in the control device and then is transmitted to the electronic device via a bidirectional communication link and is unpacked further in the electronic device as it passes through a transport layer, a session layer, a presentation layer and an application layer, and
- a second data packet, which is addressed to at least one of the bus subscribers by the electronic device, is transmitted from a transport layer of the electronic device, to a data link layer of the control device via a bidirectional communication link, is placed onto the vehicle bus by a physical layer with the inclusion of a network layer and is transported to at least one of the bus subscribers on the vehicle bus.

15. The method according to claim 14, wherein the electronic device is a mobile electronic device.

16. An arrangement for processing data packets, the arrangement comprising an electronic device, a control device, a vehicle bus which forms a network and bus subscribers, the bus subscribers and the electronic device having a communication link via the vehicle bus and the control device, the control device comprising a physical layer and a data'link layer for processing a first data packet transmitted by one of the bus subscribers, a bidirectional communication link existing between the control device and the electronic device, and the electronic device comprising a transport layer, a session layer, a presentation layer and an application layer for processing the first data packet wherein the control device further comprises a network layer for processing a second data packet which is transmitted by the electronic device, the network layer addressing the second data packet to one of the bus subscribers.

17. The method according to claim 16, wherein the electronic device is a mobile electronic device.

18. An electronic device, comprising freely programmable hardware and an application installed on the hardware, wherein the application implements a transport layer, a session layer, a presentation layer and an application layer of a layer model on the electronic device, wherein the application processes first data packets which are received by the serial interface, the processing operation being carried out without evaluating a network address, and the first data packets are converted into at least one of an image and an audio signal which is output on at least one of a display and a loudspeaker of the electronic device, and
- generates second data packets which are transmitted from the control device to a serial interface of the electronic device.

19. The electronic device according to claim 18, wherein the second data packets are transmitted free of logical addressing referring to a bus subscriber.

* * * * *